United States Patent
Chalabi et al.

(10) Patent No.: US 9,011,575 B2
(45) Date of Patent: Apr. 21, 2015

(54) GAS TREATMENT

(75) Inventors: Rifat Al Chalabi, Nottingham (GB); Ophneil Henry Perry, Nottingham (GB)

(73) Assignee: Chinook Sciences, Limited, Nottingham (GB)

(*) Notice: Subject to any disclaimer, the term of this patent is extended or adjusted under 35 U.S.C. 154(b) by 326 days.

(21) Appl. No.: 13/639,581

(22) PCT Filed: Apr. 7, 2011

(86) PCT No.: PCT/GB2011/000532
§ 371 (c)(1),
(2), (4) Date: May 29, 2013

(87) PCT Pub. No.: WO2011/124885
PCT Pub. Date: Oct. 13, 2011

(65) Prior Publication Data
US 2013/0276628 A1    Oct. 24, 2013

(30) Foreign Application Priority Data
Apr. 7, 2010    (GB) .................................. 1005731.3

(51) Int. Cl.
*B01D 46/00*    (2006.01)
*B01D 46/02*    (2006.01)
(Continued)

(52) U.S. Cl.
CPC .......... *B01D 46/006* (2013.01); *B01D 46/0058* (2013.01); *B01D 46/0068* (2013.01);
(Continued)

(58) Field of Classification Search
USPC .............. 55/301, 302, 284, 500; 95/279, 280, 95/283; 210/784, 777, 791, 797, 391, 396, 210/402, 406, 408, 409
See application file for complete search history.

(56) References Cited

U.S. PATENT DOCUMENTS 4,485,622 A * 12/1984 Takagi et al. .................... 60/296
4,720,972 A *  1/1988 Rao et al. ......................... 60/274

(Continued)

FOREIGN PATENT DOCUMENTS

DE    2529044 A1    1/1977
DE    3447294 A1    6/1986

(Continued)

OTHER PUBLICATIONS

International Search Report for PCT/GB2011/000532. Jun. 29, 2011.
(Continued)

*Primary Examiner* — Duane Smith
*Assistant Examiner* — Minh-Chau Pham
(74) *Attorney, Agent, or Firm* — Stetina Brunda Garred & Brucker

(57) ABSTRACT

This invention proposes a method of removing pollutants from high temperature gases prior to their introduction in to a heat exchanger of a steam generating boiler within a power generation system. The method places a filter system (100) in a hot gas flow path upstream of a waste-heat boiler. The filter system has at least two banks of substantially hollow elongate filters (110), each of which filters particles from the gas flow as it flows from an external surface thereof to an internal surface thereof. Valves (104, 106) enable each bank of filters to be isolated from the hot gas flow path. The method included periodically isolating at least one bank of filters while passing hot gasses through at least another of the banks of filters, and cleaning the isolated bank of filters. After cleaning the filters (110) lime is injected into the flow path so that it coats the outer surface of the filters (110) to produce a loose lime coating thereon.

10 Claims, 3 Drawing Sheets

(51) Int. Cl.
  *B01D 53/83* (2006.01)
  *F23G 7/06* (2006.01)
  *F23J 15/00* (2006.01)
  *F23J 15/02* (2006.01)

(52) U.S. Cl.
  CPC ............... *B01D46/02* (2013.01); *B01D 53/83* (2013.01); *B01D 2257/2045* (2013.01); *B01D 2257/302* (2013.01); *B01D 2273/12* (2013.01); *B01D 2273/20* (2013.01); *F23G 7/06* (2013.01); *F23J 15/003* (2013.01); *F23J 15/025* (2013.01); *F23J 2215/301* (2013.01); *F23J 2217/101* (2013.01); *F23J 2217/104* (2013.01); *Y02E 20/12* (2013.01)

(56) References Cited

U.S. PATENT DOCUMENTS

| | | | |
|---|---|---|---|
| 5,505,766 A | | 4/1996 | Chang |
| 5,897,788 A | * | 4/1999 | Ketolainen et al. ............ 210/784 |
| 5,930,994 A | * | 8/1999 | Shimato et al. ................. 60/274 |
| 5,988,080 A | * | 11/1999 | Miyoshi et al. ................ 110/343 |
| 6,090,187 A | * | 7/2000 | Kumagai ......................... 95/278 |
| 7,314,501 B2 | * | 1/2008 | Fayard ............................. 95/14 |
| 2011/0265651 A1 | * | 11/2011 | Steiner et al. .................... 95/279 |

FOREIGN PATENT DOCUMENTS

| | | |
|---|---|---|
| EP | 168863 A1 | 1/1986 |
| EP | 767343 A2 | 4/1997 |
| EP | 0 865 815 A2 | 9/1998 |

OTHER PUBLICATIONS

GB Combined Search and Examination Report, May 7, 2013.

* cited by examiner

GAS TREATMENT

CROSS-REFERENCE TO RELATED APPLICATIONS

Not Applicable

STATEMENT RE: FEDERALLY SPONSORED RESEARCH/DEVELOPMENT

Not Applicable

BACKGROUND

This invention relates to improvements in gas treatment, in particular to improvements in the removal of pollutants from hot gasses used to heat waste-heat boilers for power production.

In power generation using hot gasses to heat waste-heat boilers to produce steam, it is essential to filter particulates from, and treat acid in, the hot gasses prior to discharge downstream of the boiler.

Generally, after combustion, polluted hot exhaust gasses are passed over/through a waste-heat boiler to extract the heat therefrom to produce steam which powers steam driven turbines. Post boiler, when the polluted gasses have cooled they are passed through a combined low temperature filtration system to remove particulates and an acid treatment system to neutralize the acids in the polluted gases. Furthermore, activated carbon is generally used downstream of the boiler as part of the pollutant control system.

The result of the above are that:

1—The gases entering the boiler is filled with pollutants that get deposited on the waste-heat boiler tubes (heat exchangers)

2—For some processes that create hot gas from waste processing (municipal solid waste (MSW) and demolition waste) sticky ash (which is a pollutant that becomes fluid at high temperatures and get suspended in the hot gases and transported into the boiler) impinges on the boiler tubes, cools down and gets attached to the waste-heat boiler tubes forming a solid coating thereon that reduces the boilers tube lifetime, reduces heat exchange efficiency, and forces boiler shutdown for maintenance and/or cleaning. Known industry solutions involve reducing the temperature of the hot gas to below 600° C. so as to cool the sticky ash prior to the boiler so that it is no longer sticky. Lowering the temperature prior to the heat exchange tubes of the boiler reduces the efficiency of the system. Another known solution is to use a boiler with heat exchange tubes in parallel with the gas flow (known as a superheating part of the boiler) to remove heat from the gas flow before the gas impinges on the perpendicular tubes of the boiler. The hot gases, as not impinging on the parallel tubes, can give up some of their heat in the superheating part without the sticky ash binding to the boiler tubes. While this improves the efficiency by using more of the heat it is a far from perfect solution and some sticky ash always finds its way to the tubes and sticks to them resulting in improved efficiency but only slowing the problem rather than solving it.

3—Tar is typically generated as a result of the low temperature gasification of organics in the feedstock or incomplete combustion of the organics. The tar is carried from the processing chamber, where it is created, suspended in the hot gases into the thermal oxidizer. Typically the tars disassociate at elevated temperatures (as the case in the well designed and operated thermal oxidizer) into a simpler smaller molecules of Carbon and Hydrogen ($CO$, $CO_2$, $H_2$, $H_2O$, etc.). However, combustion system upsets and system transitional periods could, on occasion, lead to tar passing out of the thermal oxidizer without becoming fully disassociated. These tars, if not destroyed in the thermal oxidizer, impinge on the filters and bind thereto and, with time, render them inoperable as gas filters. The current industry solution is to wait for the hot gases to cool down and to collect the solidified carbons from the Tar at the cold filter waste collection.

4—Since the acid is neutralized after the boiler, the boiler heat exchange pipes are subject to high temperature acid attack which limits the life of the boiler.

5- The existent of acid also forces the boilers to operate at a reduced efficiency, by insuring that the heat extracted from the hot gas is only partial so as to ensure that the boiler exit temperature of the gases is above the dew point of acid formation.

All the above results in the necessity to regularly clean inside boilers, in particular the heat exchange tubes which regularly requires the boiler to be taken off line.

Many sources of hot gas can be used for power generation including, but not limited to, combustion of fossil fuel, e.g. coal, natural gas etc; combustion of municipal waste or demolition waste; and by product gas of other processes, e.g. oxidized or combusted volatile organic compounds from waste treatment processes. Waste heat capture for energy recovery is now becoming more widely used on many industrial processes of a varying scale.

In waste heat capture it is generally considered to be good practice to maintain, as far as is possible, unhindered gas flow upstream of, and through, the boilers.

It has been proposed previously to remove acid from hot gasses by the introduction of lime upstream of a boiler, for example it is known from GB2160301 to inject lime into combustion gas and then pass it through a particulate removal tower containing granulated slag prior to the gas exiting and passing through a boiler. A further example of use of lime upstream of a boiler is disclosed in JP 11276851 which discloses a similar type system but does not clearly describe the means of removing the lime from the gas.

None of the above systems address problems associated with sticky ash or tar and in all of the above systems the cleaning of the boiler and/or filters require that the boiler be taken off line. This is a significant disadvantage as having to take a boiler offline results in reduced efficiency and having to take filters or gas cleaning off line results in one of the necessity to shut down the gas flow or the discharge of un-cleaned gas either directly into the boiler or into the atmosphere or both.

A further reason that filters are generally not placed upstream of the boiler, in particular with a system that comprises a thermal oxidiser, is that thermal oxidizers typically operate at a fixed pressure set point (within a small window range). If known filters are directly downstream of the thermal oxidiser then as they become blocked over time the pressure would build-up gradually in the thermal oxidizer. Furthermore, if lime is used then dosing of reagent lime will lead automatically to pressure buildup in the thermal oxidizer.

The reduced flow and associated back pressure on the thermal oxidiser would impact upon the operation of the pressure sensitive burners in the oxidiser and would potentially extinguish the burner, and force the thermal oxidizer into a mal-operation, or even a dangerous operation. Hence, for these reasons alone typically filters are not used between a thermal oxidiser and the waste heat boilers.

It is an object of the present invention to provide an improved and robust means of cleaning hot gas, upstream of a boiler that addresses the problems associated with current technologies.

BRIEF SUMMARY

According to the present invention there is provided a high temperature pollutant treatment system for use in the cleaning of hot gasses prior to their introduction in to a heat exchanger of a steam generating boiler within a power generation system, the system comprising: a filter system placed in a hot gas flow path upstream of a boiler; wherein the filter system comprises at least two banks of substantially hollow elongate filters, each filter configured to filter particles from the gas flow as it flows from an external surface thereof to an internal surface thereof; and valve means to enable each bank of filters to be isolated from the hot gas flow path.

Preferably the treatment system is operative in the temperature range of above 600° C., more preferably up to 1200° C.

Preferably the system is housed in a refractory lined housing.

Preferably the valve means is configured to selectively divert the hot gas flow path between the banks of filters such that one or more of said banks of filters can be isolated without, in use, disrupting gas flow through said filter system.

One benefit of this is that the filters can be cleaned or replaced without halting power production or interrupting the cleaning of the exhaust gas.

In a preferred arrangement the pollutant treatment system may include a lime injector upstream of said filter system for selectively injecting particles of lime into the flow path and a controller for controlling the amount of lime introduced into the flow path.

The lime reacts with hydrogen acids, for example hydrogen chloride and/or sulphur acids, or with acid pre cursor substances and neutralizes them to produce inert substances which can either be filtered from the gas flow or, if gaseous can pass with the gasses through the filters without problem.

Preferably the controller introduces lime into the flow path in a stoichiometric ratio to neutralise acid or acid pre-cursor substances in the gasses. More preferably the system includes sensing means downstream of said filter system for sensing, and creating an output signal indicative of the acidity, or the acid/acid precursor substance content, of said hot exhaust gas, and wherein the controller controls the amount of lime injected in response to said output signal.

According to a second aspect of the invention there is a provided a thermal oxidiser comprising an integral high temperature pollutant treatment system integrated therein for cleaning the outlet gas of the thermal oxidiser. The thermal oxidiser may, for example, oxidise VOC's produced during the processing of, or the cleaning for recycling of, waste material. In one embodiment the lime may be injected directly into oxidiser chamber of the thermal oxidiser.

According to a third aspect of the invention there is provided a method of removing pollutants from high temperature gasses prior to their introduction in to a heat exchanger of a steam generating boiler within a power generation system, the method comprising: placing a filter system in the hot gas flow path upstream of a boiler, said filter system comprising at least two banks of substantially hollow elongate filters, each filter configured to filter particles from the gas flow as it flows from an external surface thereof to an internal surface thereof and valve means to enable each bank of filters to be isolated from the hot gas flow path; and passing hot exhaust gasses through said filters to remove pollutants therefrom.

The method may further include the steps of: periodically isolating at least one bank of filters while passing hot gasses through at least another of said banks of filters; and cleaning said isolated bank of filters.

The method may further include introducing particles of lime into the hot gas flow upstream of the filter system to at least partially neutralise acid therein and removing the lime particles and resultant salts with said filter system.

In a preferred arrangement the method further includes: sensing the acidity of the gas downstream of said filter system, creating a signal indicative of the acidity of the gas downstream of said filter system; and controlling the injection of said lime particles in response to said signal to substantially neutralise all of the acid within said exhaust gas.

Preferably, preceding the step of cleaning the isolated bank of filters, the method further includes the step of injecting lime into the flow path such that it coats the outer surface of the filters to produce a loose lime coating thereon. Preferably the loose lime coating is maintained on the filter outer surface due to the suction force created by the hot gases passing therethrough. In this manner a layer of lime powder is provided on the filters that prevents the adhesion of particular matter, in particular ash including sticky ash, to the surface of the filters.

Preferably the step of injected lime into the flow path such that it coats the outer surface of the filters to produce a lime coating thereon comprises passing at least a portion of the hot gas through the cleaned bank of filters and periodically increasing the ratio of lime injected above the stoichiometric ratio with regards the acid content of the exhaust gas such that un-reacted lime is deposited on said filters.

A preferred method of cleaning said isolated bank of filters comprises passing cleaned gas through said filters in a reverse flow direction so as to cause any particles entrapped in or on said filters to become dislodged.

The lime coating of the filters effectively creates a loose non stick layer between the filter and the particles deposited thereon, thereby facilitating the dislodgement of the particles from the filters when gas is passed therethrough in reverse.

Alternatively, or in addition, the step of cleaning said isolated bank of filters comprises creating pressure pulses of cleaned gas downstream of said isolated filters so as to cause any particles entrapped in or on said filters to become dislodged. This is again facilitated by the lime coating having prevented/reduced adhesion of particles to the filter.

The method may further comprise removing said dislodged particles from said bank of filters.

Preferably the method further includes the step of passing said cleaned gasses through a heat exchanger such that the temperature of the gas exiting said heat exchanger is below the acid dew point. As the acid has been removed this can be done without the risk of acid condensation within the boiler heat exchanger and the corrosion problems associated therewith.

The method may further including the step of monitoring at least one of: trans filter pressure and gas flow rate through a bank of filters and, if the trans filter pressure and or gas flow rate fall outside a desired parameter, isolating and clean the bank of filters in question.

BRIEF DESCRIPTION OF THE DRAWINGS

Specific embodiments of the invention are described below, by way of example, with reference to the drawings in which.

DETAILED DESCRIPTION

Figure 1:
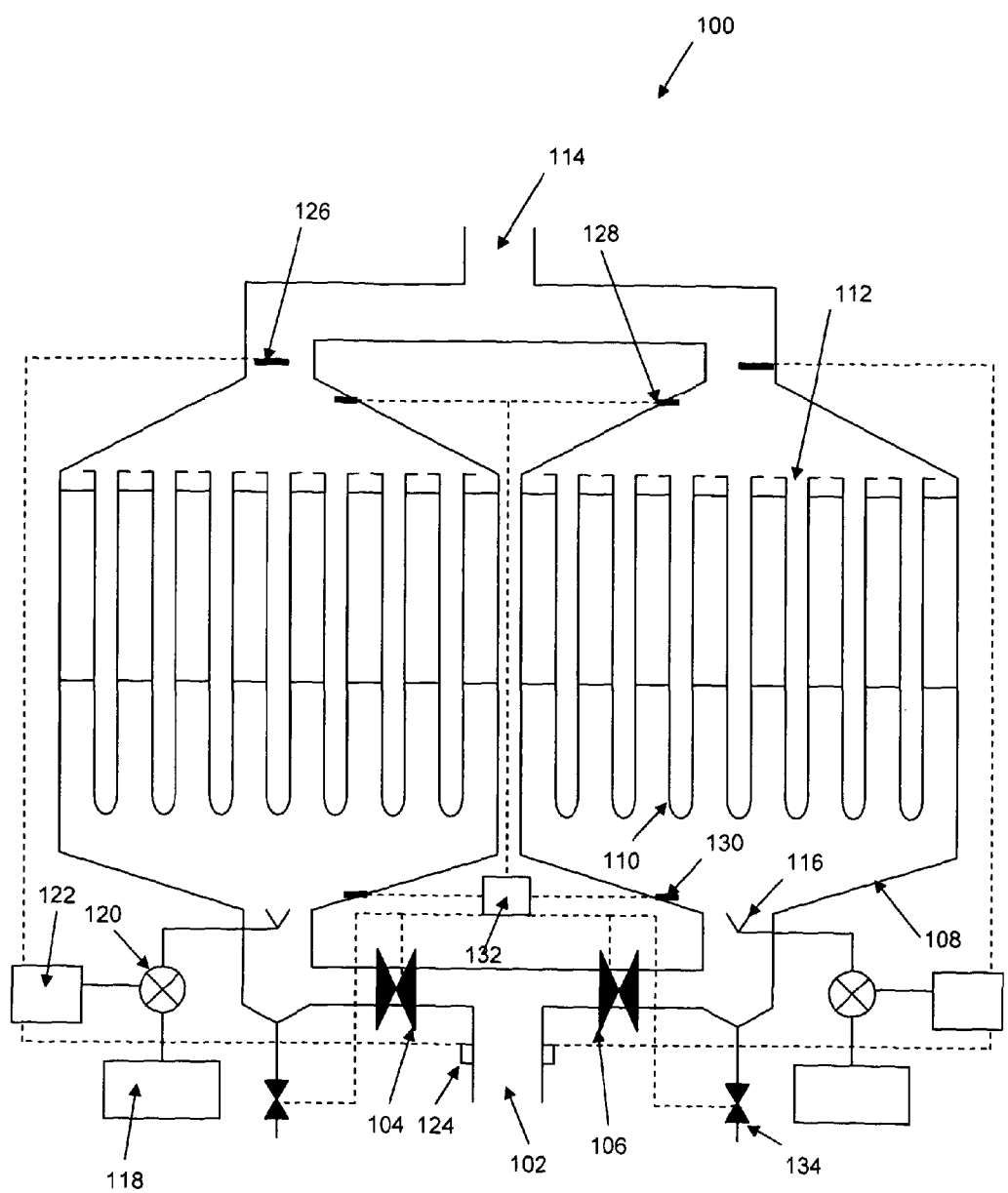
FIG. 1 shows a schematic illustration of a treatment system in accordance with the invention.

Referring to FIG. 1 a high temperature pollutant treatment system 100 is shown. The pollutant treatment system is used in the cleaning of hot gasses prior to their introduction in to a heat exchanger of a steam generating boiler within a power generation system. The pollutant treatment system 100 has an inlet 102 through which hot dirty gases typically in the region of 600 to 1200 degrees centigrade enter the treatment system. Valves 104, 106 control the flow of the hot exhaust gasses from the inlet to the individual filter chambers 108. Each valve 104, 106 is individually controllable so as to enable each filter chamber 108 to be independently isolated from the gas flow. Hot untreated gases flow through the valves 104, 106 when open and enter the filter chambers 108.

Each filter chamber contains filter bank having a plurality of filter elements 110 therein. The filter elements are elongate and substantially tubular in shape and have an exterior side exposed to the dirty gas flow and an interior side having a filter outlet 112 therein, the filter outlets being in communication with a treatment system outlet 114 through which treated gas exits the treatment system and proceeds to a heat exchanger for heat recovery. As illustrated two banks of filters are provided in this embodiment, however it is anticipated that any number of banks of filters could be provided depending on the flow rate of dirty gas required to be processed.

In use as exhaust gas is passed through the filters from the exterior side to the interior side particulates entrained therein become filtered from the system resulting in a substantially particulate free gas exiting the filters.

Lime injectors 116 are provided upstream of each filter bank for the introduction of lime from a source 118 thereof. The source of lime 118 is connected to the injector 116 via a pump 120 which controls the rate at which lime is introduced into the filter chambers 108. The lime may be provided in any convenient manner, for example as a dry powder. A controller 122 is used to control the pump 120. In use the controller 120 receives signals from sensors 124 indicative of the flow rate of gas entering the treatment system 100 and from sensors 126 in the outlet of the filter banks indicative of the acid content of the cleaned exhaust gas. As the dirty gas flows into the filter chamber the lime is introduced and reacts with the acid to neutralise it. Any particles remaining in the gas flow after the acid is neutralised are filtered out of the gas flow by the filters. 110

In use the controller 122 controls the pump 120 to vary the rate at which lime is introduced to the filer chambers 108. During a processing cycle the acidity and flow rate of the dirty gas may vary or remain fairly constant depending on their source. For example, if processing gas from a coal fired power plant prior to heat extraction then the flow rates and acid content are likely to be fairly constant with gradual changes over time as production is ramped up and ramped down. On the other hand, if for example, processing hot gas produced as part of a batch process waste processing system, for example as disclosed in W02004059229, then both the flow rate and the acid content of the dirty gas are likely to change considerably over the process cycle.

The downstream sensor 126 senses the actual acidity of the gas exiting the filters and the controller 122, in response increases or decreases the flow rate of the lime being introduced so that a substantially stoichiometric ratio of lime to incoming acid is achieved. By measuring the incoming flow rate by sensor 124 any sudden changes of surges in flow can immediately be identified and the controller 122 can modify the lime injection rate accordingly. This method of using both types of control, feed forward and feed back enables the lime rate to be best matched to the actual acid concentration of the acid in the gas. It will, however, be appreciated that either one, or the other of these methods of control could be used in isolation from the other, albeit with a slightly reduced performance.

In some processes dioxin and furan typically are destroyed (broken down) in the combustion chamber into their precursor components, however as the pollutant gases are cooled in the boiler, the dioxin/furan precursor components can reform again (re- association) using particulates in the exhaust gas as the catalyst surface, specifically in the temperature window of 250 C-400 C. In this invention, by placing the filters prior to the boiler the reformation of dioxin/furan is reduced or eliminated as all the catalyst particulates (copper, iron, dust etc) are removed while the exhaust gases are at a temperature above the reformation window temperature.

Figure 3:
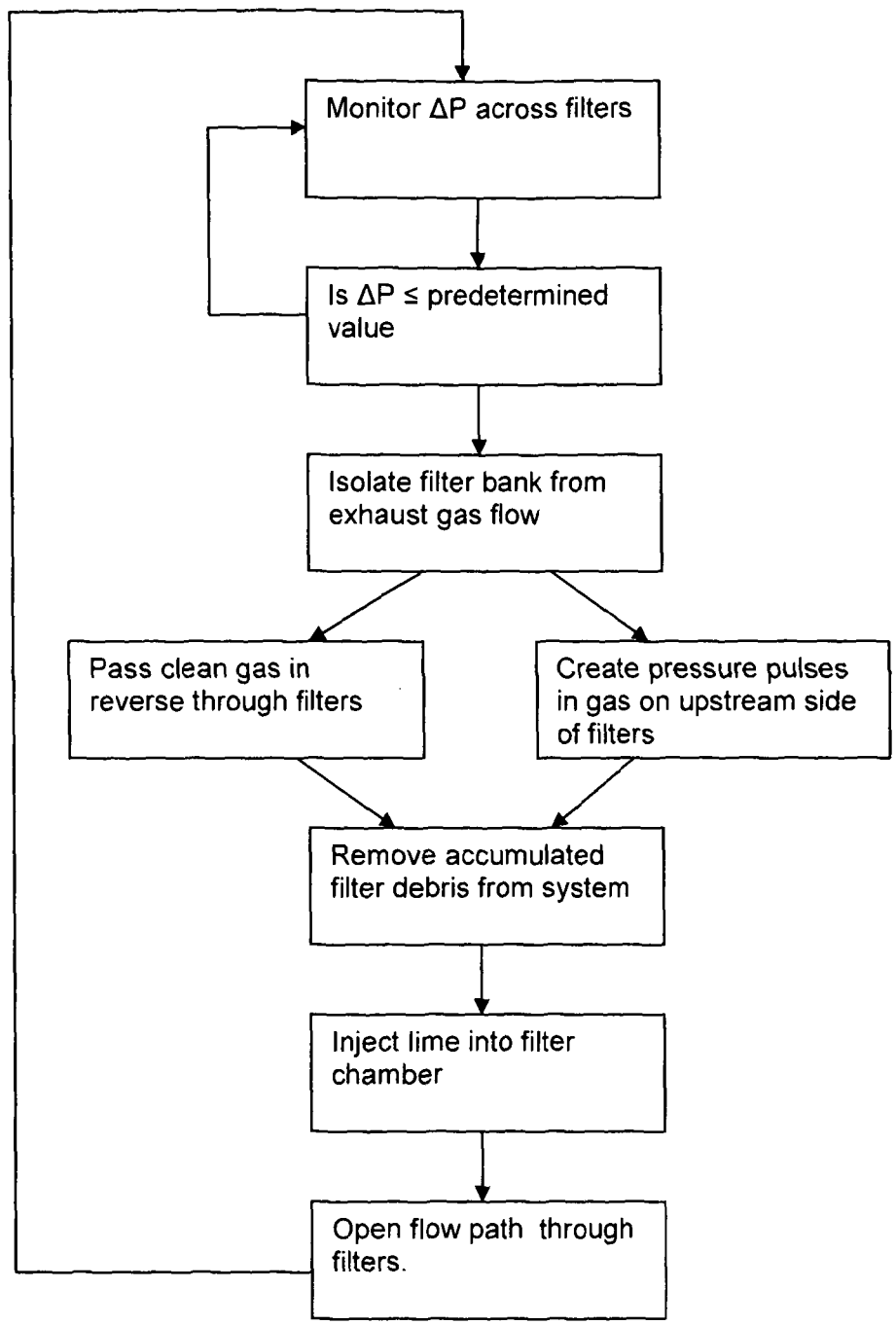
FIG. 3 shows a flow chart of the steps in the filter cleaning process in accordance with the invention.

Referring now to FIGS. 1 and 3 the treatment system 100 comprises upstream pressure sensors 128 and downstream pressure sensors 130 associated with each filter chamber 108 connected to a cleaning controller 132. The cleaning controller 132 senses the pressure drop across the filter banks and, if the pressure drop exceeds a predetermined value for a specific filter bank then that filter chamber goes into a cleaning cycle.

In the cleaning cycle the cleaning controller 132 sends a signal to the inlet valve 104, 106 of the filter chamber 108 that needs cleaning and closes that valve. The controller 132 may first check whether any other filter chambers are currently isolated before closing the valve and may only close the valve if the online filter chambers have sufficient capacity to process the dirty gas. When the online filter chambers do not have sufficient capacity to process the gas without the filter chamber that requires cleaning, the controller will wait until another filter chamber comes online prior to closing the valve to isolate the chamber in need of cleaning.

Once the filter chamber 108 in need of cleaning is isolated then the chamber is cleaned in one of two ways. The first is by the simple provision of a reverse flow of cleaned gas through the filters. This can simply be achieved by the controller sending a signal to release valve 134 to open it. Cleaned gas will then flow back through the filters 110 dislodging filtered residue built up on the external surfaces of the filters. The degree of opening of the release valve 134 is controlled to prevent an excessive reverse flow rate or pressure. As the filters are typically made of ceramic type tubular materials they have a far greater strength in compression (normal flow direction) than in tension (reverse flow direction). The lower surface of the filter chamber 108 is shaped to direct the debris falling from the filters 110 during cleaning towards a collection point which, in this case comprises the inlet to the release valve 132. In this way the debris from the filters 110 can be extracted from the filter chamber 108 along with cleaning gas passing out through the release valve 132. Alternatively collection of the debris can be otherwise arranged, for example a dedicated collection point or a removable debris trap may be provided so as to avoid the need for a separate process to separate the filter debris from the cleaning gas flow. As the lime coating has been formed as a loose lime coating it will readily part from the filters and drop off together with any sticky ash or tars that have attached thereto.

An alternative method of cleaning, instead of comprising a reverse flow of gas through the filters may simply comprise providing a pressure pulse in the gas on the downstream, side of the filters by known methods, e.g. the pulsing of valves to pressurise and release gas into the downstream area form the filters 110. The pulsation of the air effectively shakes the filer debris from the filters 110 leaving them cleaned. The filter debris maybe removed as described above.

Once the filters 110 have been cleaned then lime is injected via the lime injector 116 into the upstream area of the filter chambers 108. This may be done in a no flow condition or may be done with a flow of either clean or dirty gas. If done with a flow of gas then the lime injected is more than is required to neutralise any acid in the gas. In this manner, immediately after cleaning a layer of lime is deposited on the filters. This lime effectively provides the filters with a powdery surface reducing the ability of material to adhere to the filters. In particular ash that becomes sticky ash at high temperatures and, without the provision of an initial lime layer on the filters would tend to adhere thereto. The post cleaning injection of lime is preferably achieved by recycling some clean gasses through the filter in the normal flow direction via a recirculation conduit (not shown) which will ensure that no sticky ash or tars can bind to the filter surface before it is properly coated.

Once a sufficient amount of lime has been injected to coat the filters the valve 104,106 is reopened to allow full flow of hot gas to resume through the cleaned filter chamber. Alternatively, where there are a larger number of filter chambers than the two depicted in the drawings a master controller can compare the total flow rate through the treatment system to the number of filter banks operational and can increase or decrease the number of filter chambers in use to maximise the filtering efficiency.

During normal running the ratio of lime injected may be periodically increased above the stoichiometric ratio so as to recoat the filters with a layer of lime. This re-coating of the filters prevents a solid crust of debris forming on the filters and assists in the cleaning of the filters.

Figure 2:
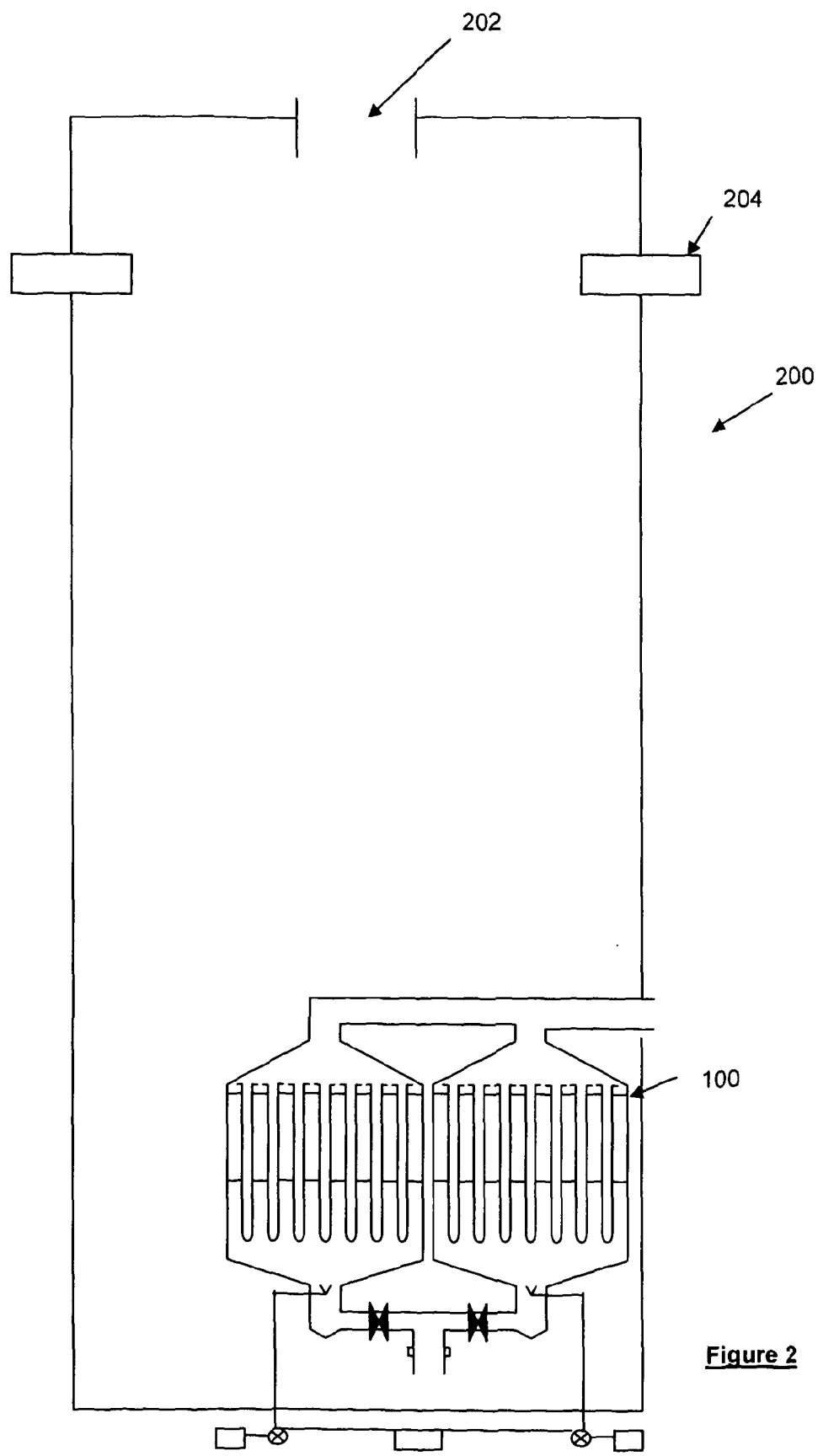
FIG. 2 shows a thermal oxidiser having an integral treatment system in accordance with the invention.

Referring to FIG. 2 a treatment system 100 as described above is incorporated into a thermal oxidiser 200 for use in the oxidation of VOC's in off gas from waste processing machinery. The oxidiser has a gas inlet 202 and burners 204 to raise the heat within the oxidiser. By incorporating the treatment system into the thermal oxidiser a separate refractory lined unit is not required and less heat loss is likely to occur due to the compact nature and single thermal enclosure of the oxidiser and treatment system. This enables greater heat extraction in the heat exchanger downstream of the filters increasing system efficiency.

The invention above offers a number of advantages over known systems which may include, without limitation:

1—Removal of particulates from the hot gas prior to the gasses entering the boiler thereby removing the catalysts that would cause dioxin/furan re-association at boiler exit temperatures, upstream of the boiler.
2—Neutralizing the acid in the hot gases upstream of the boiler, by constant stoichiometric lime injection, so that the gases going into the boiler contain no gaseous acids thereby enabling the boiler to extract more thermal energy out of the gases by virtue of (a)—Permitting the use of ultra high temperature gases into the waste-heat boilers without the fear of high temperature corrosion which causes a significant damage and downtime for waste-heat boilers connected to energy from waste plants specially when waste have plastics or other high chlorine content residue, (b)—By being able to drop the waste-heat boiler exit temperature to below the acid dew point (condensation temperatures), this is also known as low-temperature corrosion, without fear of acid attacks inside the boiler.
3—Using lime powder to coat the filters after cleaning and optionally also during filtration to act as a loose nonstick agent to prevent the blinding of the filters (blinding will be due to tar, and sticky ash that typically exist in the exhaust gas stream from waste material).
4—Upstream cleaning of the filters by isolating filter system (change over to second filter system), passing cleaned exhaust (or other clean gas) in reverse through the filters/pulsing the downstream pressure to shake particulates therefrom, discharging the collected particulates, injecting lime into the upstream side of the filtration system so that it forms a lime coating on the upstream faces of the filters, then using the system as described above.
5—Integrating the treatment system into a thermal oxidizer to produce a combined oxidizer and treatment system, its integration removes the need to have a separate refractory lined filter system which would otherwise be the case if the filters are in the hot zone prior to passing through the boiler.

Various amendments to the invention described herein will be apparent to the skilled person within the scope of the claims.

The invention claimed is:

1. A method of removing pollutants from high temperature gases prior to their introduction in to a heat exchanger of a steam generating boiler within a power generation system, the method comprising:
   placing a filter system in the hot gas flow path upstream of a waste-heat boiler, said filter system comprising at least two banks of substantially hollow elongate filters, each filter configured to filter particles from the gas flow as it flows from an external surface thereof to an internal surface thereof and valve means to enable each bank of filters to be isolated from the hot gas flow path;
   passing hot exhaust gases through said filters to remove pollutants therefrom;
   periodically isolating at least one bank of filters while passing hot gases through at least another of said banks of filters;
   cleaning said isolated bank of filters; and, after cleaning the filters, injecting lime into the flow path such that it coats the outer surface of the filters to produce a loose lime coating thereon, and further including:
   introducing particles of lime into the hot gas flow upstream of the filter system; and
   sensing the acidity of the gas downstream of said filter system,
   creating a signal indicative of the acidity of the gas downstream of said filter system; and
   controlling the injection of said lime particles in response to said signal to substantially neutralize all of the acid within said exhaust gas; and
   removing the lime particles with said filter system.

2. The method according to claim 1 wherein injecting lime into the flow path such that it coats the outer surface of the filters to produce a loose lime coating thereon comprises:
   passing at least a portion of the hot gas through the cleaned bank of filters and periodically increasing the ratio of lime injected above the stoichiometric ratio with regards the acid content of the exhaust gas such that un-reacted lime is deposited on said filters.

3. The method according to claim 1 wherein the step of cleaning said isolated bank of filters comprises:
passing cleaned gas through said filters in a reverse flow direction so as to cause any particles entrapped in or on said filters to become dislodged.

4. The method according to claim 1 wherein the step of cleaning said isolated bank of filters comprises:
creating pressure pulses of cleaned gas downstream of said isolated filters so as to cause any particles entrapped in or on said filters to become dislodged.

5. The method according to claim 3 further comprising removing said dislodged particles from said bank of filters.

6. The method according to claim 1 further including the step of, after the hot gases have been passed through filters passing said gases through a heat exchanger such that the temperature of the gas exiting said heat exchanger is below the acid dew point.

7. The method according to claim 1 further including the step of:
monitoring at least one of: trans filter pressure and gas flow rate through at least one of the at least two banks of substantially hollow elongate filters; and
if the trans filter pressure and or gas flow rate fall outside a desired parameter, isolating and clean the bank of filters in question.

8. A high temperature pollutant treatment system for use in the cleaning of hot gases in excess of 600° C. and up to 1200° C. according to the method of claim 1, prior to their introduction in to a heat exchanger of a steam generating waste-heat boiler within a power generation system, the system comprising:
a filter system placed in a hot gas flow path upstream of a waste-heat boiler, the filter system comprising at least two banks of substantially hollow elongate filters, each filter configured to filter particles from the gas flow as it flows from an external surface thereof to an internal surface thereof;
valves configured to selectively divert the hot gas flow path between the banks of filters such that one or more of said banks of filters can be isolated from the hot gas flow path without, in use, disrupting gas flow through said filter system;
a lime injector upstream of said filter system for selectively injecting particles of lime into the flow path;
a controller configured to control the lime injector to inject said lime into the flow path such that it coats the outer surface of the filters to produce a loose lime coating thereon during a start-up phase and is further configured to, during normal operation, introduce lime into the flow path in a stoichiometric ratio to neutralize acid or acid pre-cursor substances in the gases as they pass through the filter system; and
sensors downstream of said filter system configured to sense and output a signal indicative of the acidity, or the acid-acid precursor substance content, of said hot exhaust gas, and wherein the controller is further configured to control the lime injector to vary the amount of lime injected in response to said output signal.

9. A thermal oxidizer comprising an integral high temperature pollutant treatment system according to claim 8 integrated therein for cleaning the outlet gas of the thermal oxidizer.

10. The method according to claim 4 further comprising removing said dislodged particles from said bank of filters.

* * * * *